United States Patent [19]
Yanes et al.

[11] Patent Number: 6,038,676
[45] Date of Patent: Mar. 14, 2000

[54] METHOD AND CIRCUIT FOR DATA INTEGRITY VERIFICATION DURING DASD DATA TRANSFER

[75] Inventors: Adalberto G. Yanes, Rochester, Minn.; James Richard Pollock; James C. Chen, both of San Jose, Calif.; David C. Giese, Pleasanton, Calif.

[73] Assignee: International Business Machines Corporation, Armonk, N.Y.

[21] Appl. No.: 08/937,633

[22] Filed: Sep. 25, 1997

[51] Int. Cl.[7] .................................................. G06F 11/00
[52] U.S. Cl. ................................................ 714/1; 711/112
[58] Field of Search .................... 714/1, 49, 50, 714/51; 711/112, 114

[56] References Cited

U.S. PATENT DOCUMENTS

| | | | |
|---|---|---|---|
| 4,291,406 | 9/1981 | Bahl et al. | 371/44 |
| 4,434,487 | 2/1984 | Rubinson et al. | 371/10 |
| 5,155,845 | 10/1992 | Beal et al. | 395/575 |
| 5,210,660 | 5/1993 | Hetzler | 360/51 |
| 5,233,618 | 8/1993 | Glider et al. | 714/820 |
| 5,301,304 | 4/1994 | Menon | 395/500 |
| 5,463,765 | 10/1995 | Kakuta et al. | 395/182.04 |
| 5,497,472 | 3/1996 | Yamamoto et al. | 395/427 |
| 5,528,755 | 6/1996 | Beardsley et al. | 714/48 |
| 5,535,328 | 7/1996 | Harari et al. | 395/182.05 |
| 5,568,629 | 10/1996 | Gentry et al. | 711/114 |
| 5,581,790 | 12/1996 | Sefidvash | 714/48 |
| 5,717,849 | 2/1998 | Brady | 714/1 |
| 5,724,542 | 3/1998 | Taroda et al. | 711/113 |
| 5,734,861 | 3/1998 | Cohn et al. | 711/113 |
| 5,951,691 | 8/1999 | Ng et al. | 714/5 |

*Primary Examiner*—Robert W. Beausoliel, Jr.
*Assistant Examiner*—Christopher A. Revak
*Attorney, Agent, or Firm*—Sawyer & Associates; Esther Klein

[57] ABSTRACT

System and method aspects for avoiding data corruption during data transfer in a disk array environment are described. In a circuit aspect, an integrity checker includes counting logic for counting fields in the data being transferred. The integrity checker further includes comparison logic for comparing a constant value and a value in a predetermined field of data being transferred. Combinational logic is further included and coupled to the comparison logic and counting logic, wherein when the comparison logic results in a miscompare and the counting logic is at a predetermined count value, the integrity checker circuit aborts data transfer. In a method aspect, the method includes providing an integrity checker at an interface to an array of disk drives, and performing data validity determinations on data passing across the interface with the integrity checker, wherein invalid data is not transferred.

22 Claims, 3 Drawing Sheets

METHOD AND CIRCUIT FOR DATA INTEGRITY VERIFICATION DURING DASD DATA TRANSFER

FIELD OF THE INVENTION

The present invention relates generally to data transfer to a hard drive array, and more particularly to data corruption detection during data transfer.

BACKGROUND OF THE INVENTION

In recent high-technology computer systems, there exists a strong demand for considerable increases in the performance of the storage device. One of the possible solutions for increasing the performance includes a disk array, arranged by employing a large number of drives with each drive having a relatively small storage capacity. Typically, these arrays are referred to as Redundant Arrays of Inexpensive Disks (RAID) of varying levels and types. In general, RAID arrangements comprise three basic elements: a controller managing the disk array; a collection of disks of ranging capacities; and array management software, provided in the host or a controller, which uses various algorithms to distribute data across the disks and presents the array as a single virtual disk to a host computer operating system.

In one type of disk array, RAID level 3, data is subdivided and the subdivided data is processed in a parallel mode. Typically, RAID level 3 requires a dedicated hardware controller and at least three disks, where one disk is dedicated to storing parity data and the remaining disks store data. All disks service each read request and send their data in parallel to the controller. Data is segmented at the byte level. While providing high transfer rates for applications involving the movement of large files, sequential input/output (I/O) operations are slower due to the involvement of all disks in each read and write.

Another type of array, RAID level 5, has improved sequential I/O performance through elimination of a dedicated parity drive. In contrast to level 3, data and parity information are interleaved among all the disks. Further, data is segmented at a block level, is distributed, and is independently handled.

A problem exists in these RAID environments of possible corruption of data or a portion of memory. Ensuring the validity of data written to a disk remains vital, but efforts to ensure valid data have been cumbersome. Typically, software mechanisms that read data and perform comparisons have been employed to ensure data validity. Unfortunately, the use of such routines is slow, especially as the number of sectors of data being accessed increases.

Thus, a need exists for a faster, more integrated manner of performing data validity checks for a disk array.

SUMMARY OF THE INVENTION

System and method aspects for avoiding data corruption during data transfer in a disk array environment are described. In a circuit aspect, an integrity checker includes counting logic for counting fields in the data being transferred. The integrity checker further includes comparison logic for comparing a constant value and a value in a predetermined field of data being transferred. Combinational logic is further included and coupled to the comparison logic and counting logic, wherein when the comparison logic results in a miscompare and the counting logic is at a predetermined count value, the integrity checker circuit aborts data transfer. In a method aspect, the method includes providing an integrity checker at an interface to an array of disk drives, and performing data validity determinations on data passing across the interface with the integrity checker, wherein invalid data is not transferred.

With the present invention, the overhead of checking the memory by software is effectively eliminated. Further, better coverage is achieved to detect memory corruption after a transfer starts by transmit hardware writing to the drive. Also, every SCSI block is checked, because the checking is done by hardware in parallel with data transfer.

DESCRIPTION OF THE INVENTION

The present invention relates to uncorrupted data transfers to disk drives in a RAID environment. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
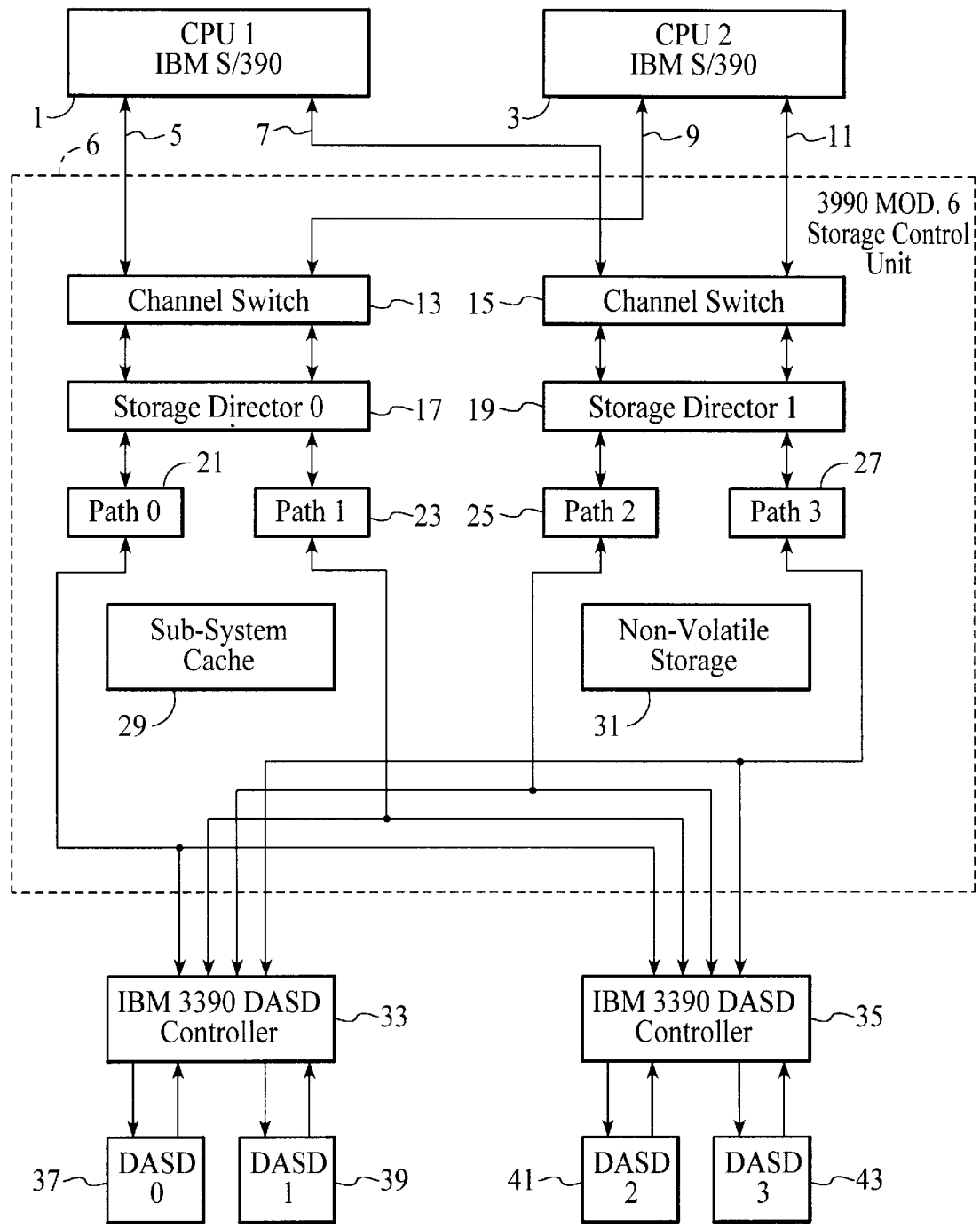
FIG. 1 shows a logical block diagram of an IBM 3990/3390 illustrative of a hierarchical demand/responsive storage subsystem.

Referring now to FIG. 1, there is shown a functional block diagram depiction of the IBM 3990/3390 Disk Storage Subsystem exemplifying a host-attached, hierarchical, demand/response storage subsystem. This subsystem is shown driven from first and second multiprogramming, multitasking hosts CPUs 1 and 3, such as an IBM System/390 running under the IBM MVS operating system. The subsystem is designed such that data stored on any of the DASDs (direct access storage devices) 37, 39, 41, and 43 can be accessed over any one of at least two failure-independent paths from either one of the CPUs 1 or 3. The system as shown provides four failure-independent paths, as is well understood by those skilled in the art. Illustratively, data on devices 37 or 39 can be reached via 3390 controller 33 over any one of paths 21, 23, 25, or 27. The same holds for data stored on devices 41 or 43 via controller 35.

The 3990 storage control unit consists of at least two storage directors 17 and 19. These are microprocessors and attendant local memory and related circuitry (not shown) for interpreting control information and data from the CPUs, establishing logical and physical paths to the storage devices, and managing fault and data recovery at the subsystem level. The read and write transfer directions are separately tuned. That is, read referencing is first made to cache 29, and read misses cause data tracks to be staged from the devices as backing stores. Write referencing, either as a format write or an update write, is made in the form of track transfers from the host to a nonvolatile store (NVS) 31. From NVS 31, data is destaged to the devices through their sundry controllers.

Typically, an application executing on a host 1 or 3 requests to read a file, write a file, or update a file. These files are ordinarily stored on a large bulk 3990/3390 DASD storage subsystem 6. The MVS host (S/390)is responsive to any read or write call from the application by invoking an access method. An access method, such as VSAM, is a portion of the operating system for forming an encapsulated message containing any requested action. This message is sent to an input/output (I/O) portion of the host, and ultimately the storage subsystem. Typically, the message includes the storage action desired, the storage location, and the data object and descriptor, if any. This "message" is turned over to a virtual processor (denominated a logical channel). The function of the logical channel is to send the message to the storage subsystem over a physical path connection (channels 5, 7, 9, 11). The storage subsystem control logic (director 17 or 19) then interprets the commands. First, a path to the designated storage device is established and passes the interpreted/accessing commands and data object to the storage device location on a real time or deferred basis. The sequence of commands is denominated "channel command words" (CCWs). It should be appreciated that the storage device may be either "logical" or "real". If the device is "logical", then device logic at the interface will map the access commands and the data object into a form consistent with the arrangement of real devices. Thus, for example, a RAID 5 array of small DASDs may substitute for one or more IBM 3390 large DASDs.

Figure 2:
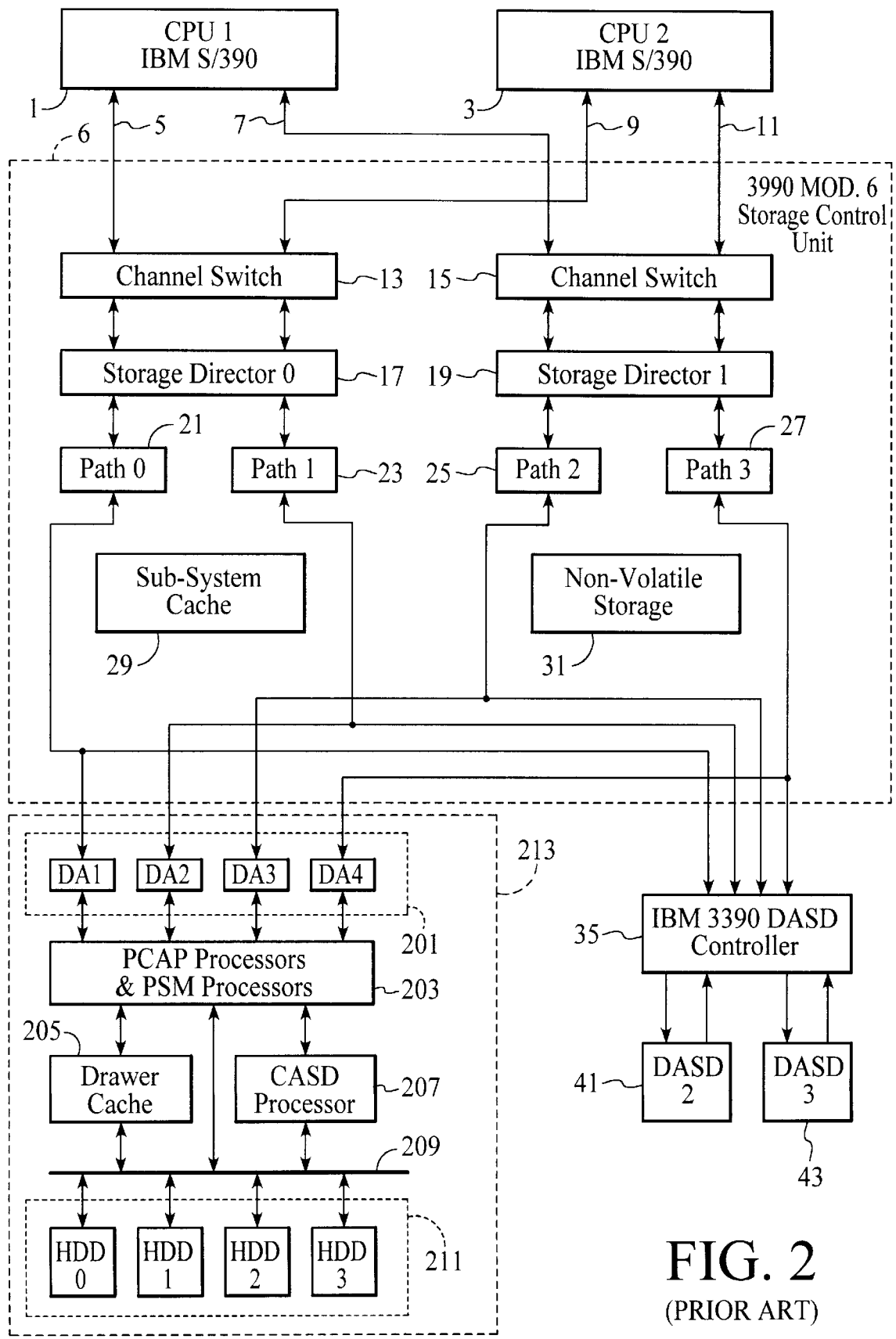
FIG. 2 depicts the subsystem of FIG. 1 but is modified to set out the attachment of a RAID 5-DASD array as a logical 3390 DASD in addition to the attachment of real 3390 DASDs.

Referring now to FIG. 2, there is depicted the subsystem of FIG. 1, but modified to set out the attachment of a RAID 5 DASD array 213 as a logical 3390 DASD, in addition to the attachment of real 3390 DASDs 41, 43. In this regard, the IBM 3990 SCU Model 6 utilizes a large cache 29 (e.g., up to 2 gigabytes). The data is suitably staged and destaged in the form of 3380/3390 tracks, where staging data occurs between a plurality of logical 213 or real 3390 DASDs 35, 41, 43 and the 3990 cache 29 and destaging data occurs between a non-volatile write buffer 31 and the logical or real 3390 DASDs.

Further depicted is the RAID 5 array 213, i.e., drawer, of small DASDs 211 attached to the control logic 17, 19 of the IBM 3990 storage control unit 6 over the plurality of paths 21, 23, 25, and 27 via device adapters (DAs) 201. An exemplary implementation of RAID 5 arrays is an IBM RAMAC Array DASD, which attaches one or more Enterprise System (S/390)CKD channels through an IBM 3990 Model 3 or 6 storage control unit, and comprises a rack with a capacity between 2 to 16 drawers. Suitably, each drawer 213 includes four disk drives HDD0-HDD3, cooling fans, control processor 207, ancillary processors 203, and a non-volatile drawer cache 205. A track staging/destaging with three DASDs' worth of data space and one DASD's worth of parity is configured in a RAID 5 DASD array. Each drawer 213 suitably emulates between two to eight IBM 3390 Model 3 volumes.

Functionally, the DAs 201 provide electrical and signal coupling between the control logic 17 and 19 and one or more RAID 5 drawers. As data tracks are staged and destaged through this interface, they are suitably converted from variable length CKD (count, key, data) format to fixed-block length (FBA) format by the ancillary processors 203. In this regard, drawer cache 205 is the primary assembly and disassembly point for the blocking and reblocking of data, the computation of a parity block, and the reconstruction of blocks from an unavailable array of DASDs. In the illustrated embodiment, the four DASDs 211 are used for storing parity groups. If a dynamic (hot) sparing feature is used, then the spare must be defined or configured a' priori. Space among the four operational arrays is distributed such that there exists three DASDs' worth of data space and one DASD's worth of parity space. It should be pointed out that the HDDs 211, the cache 205, and the processors 203 and 207 communicate over an SCSI-managed bus 209. Thus, the accessing and movement of data across the bus between the HDDs 211 and the cache 205 is closer to an asynchronous message-type interface.

Data transfer across SCSI bus 209 in the RAID 5 array utilizes blocks. For purposes of this discussion, a SCSI block refers to 688 bytes of data. Of course, other number of bytes, such as 512, may be appropriate for other system arrangements. Thus, the discussion is intended to be illustrative and not restrictive of the present invention. With 688 bytes, there are 172 fields, each field comprising 4 bytes of data, within each SCSI block. Suitably, the second field of the 172 fields comprises four bytes as an address translation (ADT) field. The four bytes of the ADT field uniquely identify each SCSI block of the logical 3390 tracks stored on the drive. For each transfer operation, the ADT field value should be the same in the SCSI blocks. Any mismatch is indicative of data corruption. Restated, upon read back or staging of the data from a DASD, detection of any non-zero syndrome is an indication of random or burst error in the data.

Thus, the present invention suitably utilizes the ADT field as a mechanism to not only access the customer data, but for checking purposes to ensure data integrity of the customer data, as well. In a preferred embodiment, a hardware circuit checks the ADT value of the SCSI blocks as they are written to the drive. With this approach, the present invention ably detects data corruptions at the lower interface (SCSI) before the data is written to the drive. Previously, attempts to use software to check for data validity significantly decreased performance and therefore were not normally utilized. With the integrated approach of the present invention, a corruption in the drawer memory or a corruption of data by the transmit hardware on the write to the drive is capably detected.

Figure 3:
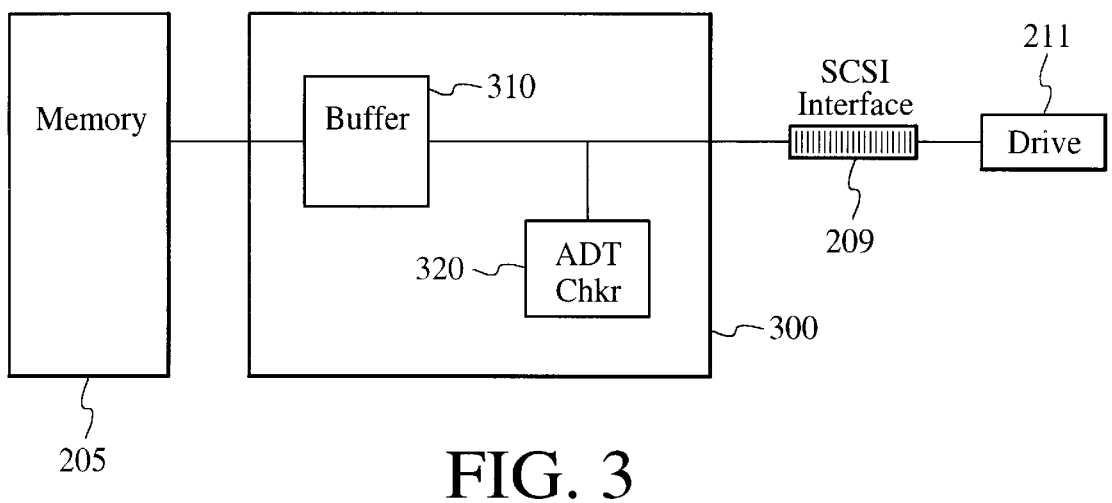
FIG. 3 illustrates a portion of an array with an integrity checker circuit.
Figure 4:
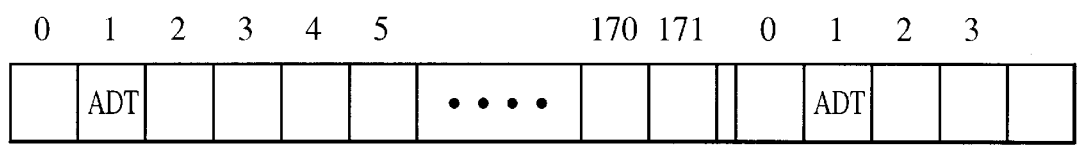
FIG. 4 illustrates an exemplary embodiment of a SCSI block of data.

As shown in FIG. 3, preferably an integrity checker 300 is provided in accordance with the present invention between cache memory 205 and the SCSI interface 209 of the RAMAC array (FIG. 2). As data is transferred from cache 205 to drive 211 via SCSI bus 209, the integrity checker 300 performs valid data determinations. Suitably, integrity checker 300 includes a buffer 310 for staging the data and a ADT checker device 320. Preferably, the integrity checker 300 determines whether a valid ADT field is present in each SCSI block being transferred. As shown in FIG. 4, in the exemplary embodiment, the ADT field being checked comprises the second field, '1', of the 172 fields, 0–171, of each SCSI block being transferred.

Figure 5:
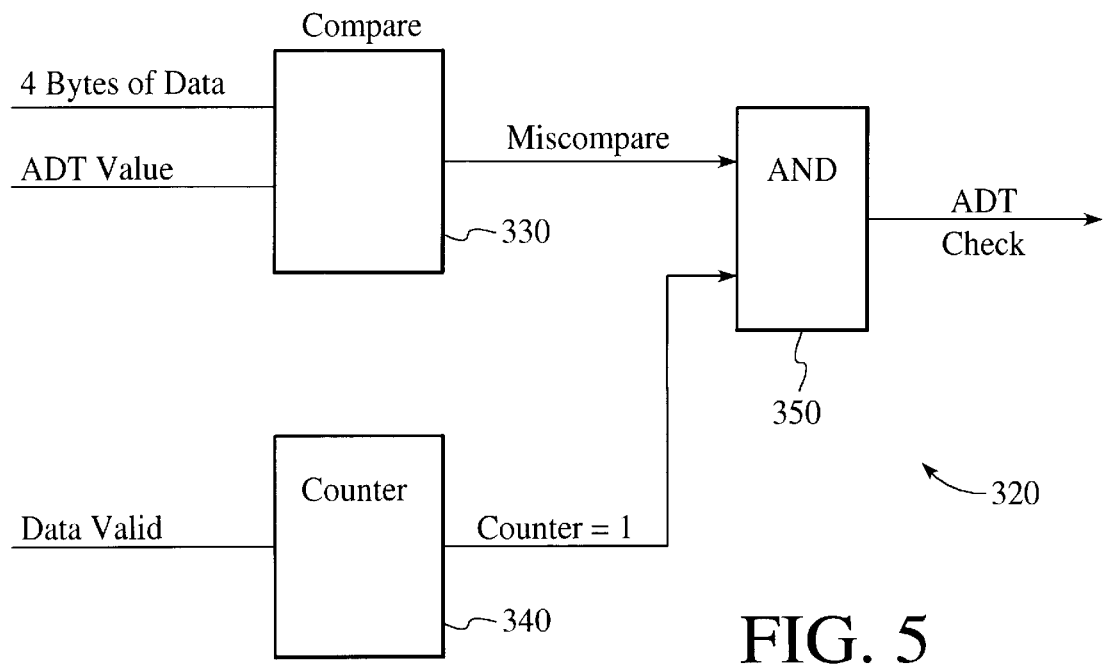
FIG. 5 illustrates the integrity checker circuit of FIG. 3 in greater detail.

Referring now to FIG. 5, a preferred embodiment of ADT checker 320 of the integrity checker 300 is illustrated more particularly. The ADT checker 320 suitably comprises comparator logic 330, counter logic 340, and combinational logic 350. The counting operation of the counter logic 340 suitably initiates after the write operation to the drive 211 starts. In the exemplary embodiment of the 688 byte SCSI block, the counter logic 340 wraps back to zero after counting every four-byte field up to 172 for each block. Comparator logic 330 suitably receives the proper ADT value for the data from the software that initiates the transfer operation by loading the data into a four-byte register of the comparator logic 330. This constant ADT value of four bytes is suitably compared against a four-byte value in the data being transferred. Preferably, the comparison occurs when the counter logic 340 is at a one count value, so that the ADT field in the data being transferred is properly compared to the constant ADT value.

The comparator logic 330 suitably determines whether the constant ADT value matches the four bytes of data being transferred. When a logic one value from the counter logic 340 indicates the field value being compared is the ADT field of the SCSI block and the comparator logic 330 identifies a miscompare condition, an ADT check signal is generated by combinational logic 350, e.g., an AND gate. The ADT check signal suitably signals an abort condition to the SCSI interface 209 to abort the transfer operation. Thus, the write operation to drive 211 is immediately terminated, and an error is posted to the software. Preferably, the software redrives the entire operation using a backup copy of the data which stays resident in the subsystem until a successful write of the data to the drive occurs, as is will understood by those skilled in the art. Through the concurrent data validity checking of the present invention during data writing, the retrying of the write operation is possible and avoids data corruption before the data reaches the drive.

Although the present invention has been described in accordance with the embodiments shown, one of ordinary skill in the art will readily recognize that there could be variations to the embodiments and those variations would be within the spirit and scope of the present invention. For example, although the integrity checker of the present invention is described in terms of particular logic device combinations, other combinations may be employed if desired to achieve the data validity determinations as described herein. Accordingly, many modifications may be made by one of ordinary skill in the art without departing from the spirit and scope of the appended claims.

What is claimed is:

1. An integrity checker circuit for a RAID arrangement for verifying data during SCSI block data transfers, the integrity checker circuit comprising:

counting logic for counting fields in the data being transferred;

comparison logic for comparing a constant value and a value in a predetermined field of the data being transferred; and combinational logic coupled to the comparison logic and counting logic, wherein when the comparison logic results in a miscompare and the counting logic is at a predetermined count value, the integrity checker circuit aborts data transfer.

2. The circuit of claim 1 wherein the comparison logic compares four byte data values.

3. The circuit of claim 1 wherein the predetermined field comprises an address translation field.

4. The circuit of claim 1 wherein the predetermined count value comprises a count value of one.

5. The circuit of claim 1 wherein the combinational logic comprises an AND gate.

6. The circuit of claim 1 wherein the counting logic counts fields of four-byte values.

7. A disk drive array system capable of avoiding corrupted data transfer, the system comprising:

memory means;

integrity checker circuit coupled to the memory means for receiving data and comprising counting logic for counting fields in the data being transferred to the disk drive array, comparison logic for comparing a constant value and a value in a predetermined field of the data being transferred, and combinational logic coupled to the comparison logic and counting logic, wherein when the comparison logic results in a miscompare and the counting logic is at a predetermined count value, the integrity checker circuit aborts data transfer;

SCSI interface means coupled to the integrity checker circuit; and disk drive array coupled to the SCSI interface, wherein the integrity checker circuit ensures uncorrupted data transfer across the SCSI interface to the disk drive array.

8. The system of claim 7 wherein the comparison logic compares four-byte data values.

9. The system of claim 7 wherein the predetermined field comprises an address translation field.

10. The system of claim 7 wherein the predetermined count value comprises a count value of one.

11. The system of claim 7 wherein the combinational logic comprises an AND gate.

12. The system of claim 7 wherein the counting logic counts fields of four-byte values.

13. The system of claim 7 wherein the memory means further comprises cache memory.

14. A method for avoiding storage of corrupted data in an array of disk drive of a RAID environment, the method comprising:

providing an integrity checker at an interface to the array of disk drives the integrity checker including a buffer and an address translation (ADT) checker, the ADT checker including comparator logic, counting logic, and combinational logic; and performing data validity determinations on data passing across the interface with the integrity checker, wherein invalid data is not transferred.

15. The method of claim 14 further comprising performing comparisons between a value in a predetermined field of the data with a valid constant for the data with the comparator logic when the counting logic is at a predetermined count value.

16. The method of claim 15 wherein when the value and the valid constant do not match, the data is not transferred.

17. The method of claim 15 further comprising combining the results of the comparison and the count from the counting logic to the combinational logic.

18. The method of claim 17 wherein when the count value is one and the comparison results in a miscompare, the transfer is aborted.

19. The method of claim 15 wherein the predetermined field is the ADT field.

20. The method of claim 15 wherein the comparator logic compares 4-byte data values.

21. The method of claim 14 wherein the data comprises a chosen number of blocks.

22. The method of claim 21 wherein each of the chosen number of blocks comprises 688 bytes of data.

\* \* \* \* \*